United States Patent Office 3,360,437
Patented Dec. 26, 1967

3,360,437
METHOD OF OBTAINING IMPORTANT CONSTITUENTS FROM POLLEN
Carl Gösta Carlsson, Sandakra, Vegeholm, Sweden, assignor to AB Cernelle, Vegeholm, Sweden, a corporation of Sweden
No Drawing. Filed July 29, 1964, Ser. No. 386,068
Claims priority, application Sweden, July 30, 1963, 8,388/63
8 Claims. (Cl. 195—1)

It is a known fact that pollen contains a multitude of substances valuable as nutrients and in certain cases also as medicines. It is therefore important to be able to obtain these valuable substances from the pollen. For this purpose it has been suggested for example to subject pollen to an extraction procedure comprising first extracting the pollen in fresh or dried state with water containing a volatile water-soluble solvent and then extracting the pollen with one or more volatile lipid-solving solvents, which extracting procedure may be repeated one or more times, and recovering the extracted pollen constituents from the solvents for example by evaporation of the latter.

It has now been found that a better result may be attained in the extraction of pollen if the extracts obtained by extracting pollen with water containing a volatile water-soluble solvent are subjected to digestion by means of a mold of the genus Mucor. This will decompose the high-molecular compounds in the extract.

One object of this invention is to provide a method of obtaining from pollen valuable nutrients such as sugars, amino acids and vitamins.

Another object of the invention is to provide a method for the extraction from pollen of substances which may be used as medicines to increase the resistance against infections and inflammations.

Still another object of the invention is to provide a method of obtaining from pollen certain extracts of a nature that will reduce the risk of allergies when taking the extracts or the nutrients or medicines obtained therefrom.

A further object of the invention is to provide a method of decomposing high-molecular substances in pollen extracts into low-molecular substances.

The digestion effected by means of a mold of the genus Mucor is preferably carried out in direct connection with the extraction with water containing a volatile water-soluble solvent and in the presence of the pollen subjected to the extraction. Optimum conditions include using a temperature of about 30–32° C., for example about 30° C.

It has been found particularly that high-molecular proteins are decomposed during this digestion into low-molecular proteins or even into the individual amino acids by which they are constituted.

By light absorption measurement it is possible to control the amount recovered from the contents of the pollen grains and to control how far the decomposition of the high-molecular compounds has proceeded so that the digestion can be interrupted at the correct moment.

By subjecting the extract obtained from pollen by means of water containing a water-soluble solvent, to digestion with a mold of the genus Mucor, as is suggested by the present invention, one also gains the advantage of a reduced risk of allergies arising when the nutrients or medicines obtained from the extract are taken. At the same time the resorbability of the valuable substances in the extract is increased. It has also been found that the yield of the extraction with water and a water-soluble solvent increases when the digestion is carried out following directly upon the extraction. Furthermore, the yield of a subsequent lipid extraction actually increases also.

Of the valuable substances that may be obtained from the extracts there may be mentioned amino acids, vitamins and deoxyribosides.

The method of the present invention is preferably carried out as follows. There is first effected an extraction of the pollen grains with water containing a volatile water-soluble solvent and in direct connection therewith a digestion, in the presence of the pollen grains, with a mold of the genus Mucor. After the separation of the extract from the pollen grains these are subjected to an extraction with a lipid-solving solvent. Thereafter the pollen grains are again subjected to an extraction with water containing a volatile water-soluble solvent and as a sufficient amount of the mold of the genus Mucor has survived in the pollen grains, the extract may be subjected to a digestion without any new addition of mold. This digestion is conducted at a suitable temperature in direct connection with the extraction. After this digestion, still another lipid extraction is suitably effected on the pollen grains separated from the extract. This series of treatments may be repeated still another or several times for a complete recovery of all of the important constituents from the pollen.

The water-soluble solvent preferably is ethyl alcohol or acetone, and the lipid-solving solvent preferably is ethyl ether or acetone.

For better elucidation of the method according to the invention reference is made to the following example which must not, however, be considered limitative to the scope of the invention.

*Example*

120 kg. of pollen collected from Phleum pratense were extracted in a container with 600 kg. of a solvent consisting of a 20% solution of ethyl alcohol in distilled water by agitation for 48 hours at a temperature of 30–32° C. For digesting the resulting extract there was then added in the container an inocculate of *Mucor hiemalis*, and the agitation was carried on for a further 48 hours at room temperature (18–20° C.). After filtration a clear solution was obtained, which when analysed proved to contain such substances extracted from pollen, as vitamins, sugars, deoxyribosides and trace metals as well as degradation products of high-molecular compounds, for example amino acids.

The pollen residue remaining after the filtration was subjected to another extraction by addition of 400 kg. of ethyl ether and agitation for 48 hours at room temperature. After the pollen residue had been removed in the centrifuge a clear solution was obtained. When analyzed this solution proved to contain such lipid-soluble substances as steroles, waxes and chlorophyll.

When the pollen residue resulting from the centrifugation was again subjected to the sane series of treatments as described above, another yield of the above-mentioned water-soluble constituents and the degradation products was obtained as well as a new yield of the lipid-soluble constituents.

When the products obtained according to this example were used as nutrients or medicines it was established that the risk of undesirable allergic secondary effects arising had decreased as compared with corresponding products prepared in the same way but dispensing with the digestion by means of a mold of the genus Mucor.

What I claim and desire to secure by Letters Patent is:
1. A method for obtaining important constituents from pollen by extraction which comprises
   (a) extracting pollen with an aqueous solution of a member selected from the group consisting of ethyl alcohol and acetone,
   (b) subjecting the resulting extract in the presence of the pollen to digestion with *Mucor hiemalis* for a period of about 48 hours, and

(c) separating the resulting digested solution from the pollen residue.

2. A method as in claim 1 wherein a 20% aqueous ethyl alcohol solution is employed.

3. A method as in claim 1 wherein the digestion of the extract with *Mucor hiemalis* is conducted at a temperature of about 30° C.

4. A method as in claim 1 wherein an aqueous acetone solution is employed.

5. A method for obtaining important constituents from pollen by extraction which comprises
   (a) extracting pollen with an aqueous solution of a member selected from the group consisting of ethyl alcohol and acetone,
   (b) subjecting the resulting extract in the presence of the pollen to digestion with *Mucor hiemalis* for a period of about 48 hours,
   (c) separating the resulting digested solution from the pollen residue,
   (d) subjecting the pollen residue to extraction with a volatile lipid-solving solvent selected from the group consisting of ethyl ether and acetone, and
   (e) separating the resulting extract from the pollen residue.

6. A method as in claim 5 wherein aqueous acetone solution is employed in step (a).

7. A method as in claim 5 wherein the volatile lipid-solving solvent is acetone.

8. A method for obtaining important constituents from pollen by extraction which comprises
   (a) extracting pollen with an aqueous solution of a member selected from the group consisting of ethyl alcohol and acetone,
   (b) subjecting the resulting extract in the presence of the pollen to digestion with *Mucor hiemalis* for a period of about 48 hours.
   (c) separating the resulting digested solution from the pollen residue,
   (d) subjecting the pollen residue to extraction with a volatile lipid-solving solvent selected from the group consisting of ethyl ether and acetone,
   (e) separating the resulting extract from the pollen residue, and
   (f) repeating steps (a) to (e) sequentially at least once, using the obtained pollen residue as the starting material in place of the pollen referred to in step (a).

References Cited
UNITED STATES PATENTS

| | | | |
|---|---|---|---|
| 2,207,415 | 7/1940 | Rosenwald | 167—78.1 |
| 2,500,145 | 3/1950 | Ferguson | 167—78.1 |

OTHER REFERENCES

Noyes, A Report, Svenssons Boktoyckeri, Bastad 1961, pages 1 to 8.

Jonsson, Prostatitis and Pollen, reprint translated from the Swedish Medical Journal, 1961, 58, 2487.

Leander, reprint translated from Svenska Lakartidningen, 1962, 59, 3296, pages 1 to 10.

ALVIN E. TANENHOLTZ, *Primary Examiner.*